(12) United States Patent
Kumar et al.

(10) Patent No.: US 10,999,639 B2
(45) Date of Patent: *May 4, 2021

(54) ENHANCED CONTENT INTERFACE

(71) Applicant: Comcast Cable Communications, LLC, Philadelphia, PA (US)

(72) Inventors: Lokesh Kumar, Vienna, VA (US); Surendra Goel, Mclean, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/721,282

(22) Filed: Sep. 29, 2017

(65) Prior Publication Data
US 2019/0045267 A1    Feb. 7, 2019

Related U.S. Application Data

(63) Continuation of application No. 13/779,085, filed on Feb. 27, 2013, now Pat. No. 9,826,275.

(51) Int. Cl.
| | |
|---|---|
| *H04N 21/4722* | (2011.01) |
| *H04N 21/475* | (2011.01) |
| *H04H 60/33* | (2008.01) |
| *G06Q 50/00* | (2012.01) |
| *H04N 21/466* | (2011.01) |
| *H04N 21/4788* | (2011.01) |
| *H04N 21/482* | (2011.01) |

(52) U.S. Cl.
CPC ......... *H04N 21/4722* (2013.01); *G06Q 50/01* (2013.01); *H04H 60/33* (2013.01); *H04N 21/4667* (2013.01); *H04N 21/4756* (2013.01); *H04N 21/4788* (2013.01); *H04N 21/4821* (2013.01)

(58) Field of Classification Search
CPC .......... H04N 21/4722; H04N 21/4667; H04N 21/4756; H04N 21/4788; H04N 21/4821; H04N 21/25891; H04N 21/4312; H04N 21/4314; H04N 21/4318; H04N 21/44204; H04N 21/44213; H04N 21/44222; H04N 21/4725; H04N 21/4758; H04N 21/4854; G06Q 50/01
See application file for complete search history.

(56) References Cited

U.S. PATENT DOCUMENTS

| | | | |
|---|---|---|---|
| 6,377,984 B1 | 4/2002 | Najork et al. | |
| 7,849,482 B2 * | 12/2010 | Sharkey | H04N 21/4312 725/46 |
| 7,921,067 B2 | 4/2011 | Kemp et al. | |
| 7,984,467 B2 | 7/2011 | Hansen-Turton | |
| 8,458,745 B2 * | 6/2013 | Shanks | H04N 5/44543 725/40 |

(Continued)

*Primary Examiner* — Hai V Tran
(74) *Attorney, Agent, or Firm* — Ballard Spahr LLP

(57) ABSTRACT

Systems and methods for presenting content are disclosed. One method can comprise presenting an interface such as a content guide comprising a field relating to content. A selection of one or more of a plurality of filters can be received. A first indicator representing first information can be presented if a first one of the filters is selected, wherein the first information relates to the field. A second indicator representing second information can be presented if a second one of the filters selected, wherein the second information relates to the field.

22 Claims, 15 Drawing Sheets

(56) References Cited

U.S. PATENT DOCUMENTS

| | | | |
|---|---|---|---|
| 8,650,488 | B1 | 2/2014 | Wattenhofer et al. |
| 8,862,155 | B2 | 10/2014 | Stern et al. |
| 2002/0042923 | A1 | 4/2002 | Asmussen et al. |
| 2003/0028889 | A1 | 2/2003 | McCoskey et al. |
| 2003/0028896 | A1 | 2/2003 | Swart et al. |
| 2003/0237096 | A1 | 12/2003 | Barrett et al. |
| 2004/0031052 | A1 | 2/2004 | Wannamaker et al. |
| 2007/0157220 | A1 | 7/2007 | Cordray et al. |
| 2007/0240180 | A1* | 10/2007 | Shanks ............... H04N 21/482 725/14 |
| 2008/0066102 | A1* | 3/2008 | Abraham ........... H04N 21/4143 725/37 |
| 2009/0007178 | A1* | 1/2009 | Artom ............... H04N 21/4312 725/40 |
| 2009/0132383 | A1* | 5/2009 | Piepenbrink ....... G06Q 30/0601 705/26.1 |
| 2009/0158340 | A1 | 6/2009 | Patel et al. |
| 2009/0165045 | A1* | 6/2009 | Stallings ............ H04N 21/4312 725/39 |
| 2009/0293079 | A1* | 11/2009 | McKee .................. H04L 51/32 725/10 |
| 2010/0031193 | A1* | 2/2010 | Stark ................. H04N 21/4312 715/810 |
| 2010/0050202 | A1 | 2/2010 | Kandekar et al. |
| 2010/0154003 | A1 | 6/2010 | Bi et al. |
| 2010/0293575 | A1 | 11/2010 | Biniak |
| 2011/0131609 | A1 | 6/2011 | Delegue et al. |
| 2011/0313967 | A1 | 12/2011 | Zafar et al. |
| 2012/0030586 | A1 | 2/2012 | Ketkar |
| 2012/0041939 | A1 | 2/2012 | Amsterdamski |
| 2013/0097176 | A1 | 4/2013 | Khader et al. |
| 2015/0195624 | A1* | 7/2015 | Gossweiler, III .. H04N 21/4312 725/40 |

* cited by examiner

ENHANCED CONTENT INTERFACE

CROSS REFERENCE TO RELATED APPLICATION

This application is a continuation of U.S. application Ser. No. 13/779,085, filed Feb. 27, 2013 which is herein incorporated by reference in its entirety.

BACKGROUND

As the amount of communication increases, users of media networks are provided with an increasing number of options for content programming. For example, while users were once provided with only a few television channels, now hundreds of program channels are available, as well as interactive applications. Because of the large number of options now available, users often utilize a program guide. The program guide can be configured with a graphical user interface for navigating the plurality of program channels and/or services provided in the media network. In addition, the program guide can include logic for arranging the program options in one or more configurations, including arranging the program options by title, channel, and/or theme. As an example, the program guide can allow a viewer to use a remote control device to scroll through content as desired, both horizontally across time and vertically through the channel grid.

However, current content devices and program guides do not provide a sufficient means to present increasing viewing options such as supplemental content information, while providing a unique user experience. These and other shortcomings are addressed by the present disclosure.

SUMMARY

It is to be understood that both the following general description and the following detailed description are exemplary and explanatory only and are not restrictive. Provided are methods and systems for presenting content.

In an aspect, methods can comprise presenting an interface comprising a field relating to content. A selection of one or more of a plurality of filters can be received. A first indicator can be presented, the first indicator representing first information if a first one of the plurality of filters is selected. The first information can relate to the field. A second indicator can be presented, the second indicator representing second information if a second one of the plurality of filters is selected. The second information can relate to the field.

In another aspect, methods can comprise presenting an interface (e.g., content guide) comprising a field relating to content. First information can be received relating to the content. Second information can be received relating to the content. A first indicator can be presented representing the first information. A second indicator can be presented representing the second information. A selection of a filter can be received. One or more of the first information and the second information can be filtered based upon the selected filter. One or more of the first indicator and the second indicator can be updated based on one or more of the filtered first information and the filtered second information.

In a further aspect, methods can comprise presenting an interface, such as a content guide, comprising a field relating to content. First information relating to the content can be received from a first source. Second information relating to the content can be received from a second source. The first source and the second source can be the same or different. A selection of one or more of a plurality of filters can be received. A first indicator representing the first information can be presented if a first one of the plurality of filters is selected. The first indicator can be presented adjacent the field. A second indicator representing the second information can be presented if a second one of the plurality of filters is selected. The second indicator can be presented adjacent the field.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
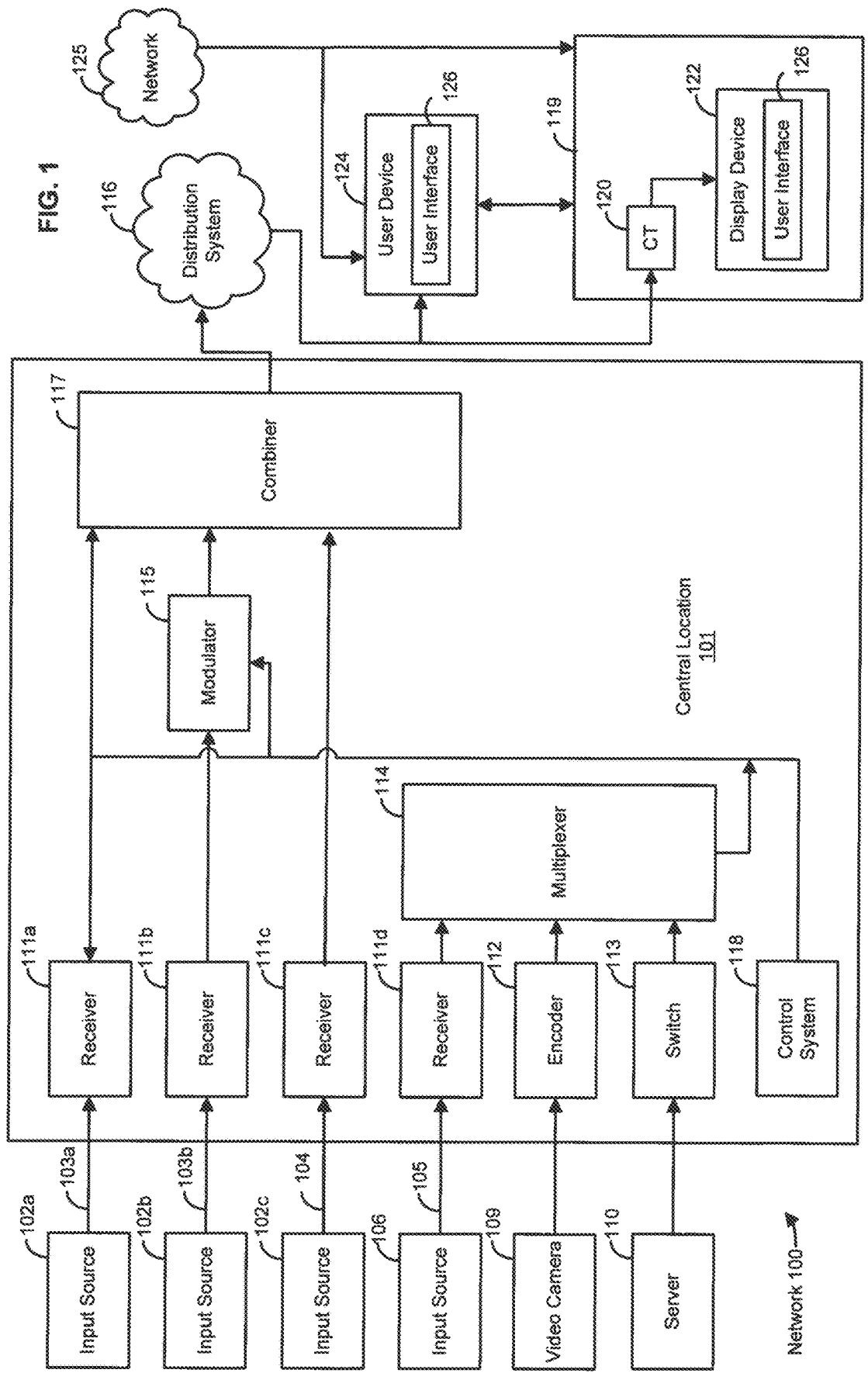
FIG. 1 is a block diagram of an exemplary network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1 illustrates various aspects of an exemplary network in which the present methods and systems can operate. The present disclosure relates to systems and methods for presenting data such as content. Those skilled in the art will appreciate that present methods may be used in systems that employ both digital and analog equipment. One skilled in the art will appreciate that provided herein is a functional description and that the respective functions can be performed by software, hardware, or a combination of software and hardware.

In an aspect, network 100 can comprise a central location 101 (e.g., a control or processing facility in a fiber optic network, wireless network or satellite network, a hybrid-fiber coaxial (HFC) content distribution center, a processing center, headend, etc.), which can receive content (e.g., data, input programming, and the like) from multiple sources. The central location 101 can combine the content from the various sources and can distribute the content to user (e.g., subscriber) locations (e.g., location 119) via distribution system 116.

In an aspect, the central location 101 can create content or receive content from a variety of sources 102a, 102b, 102c. The content can be transmitted from the source to the central location 101 via a variety of transmission paths, including wireless (e.g. satellite paths 103a, 103b) and terrestrial path 104. The central location 101 can also receive content from a direct feed source 106 via a direct line 105. Other input sources can comprise capture devices such as a video camera 109 or a server 110. The signals provided by the content sources can include, for example, a single content item or a multiplex that includes several content items. In an aspect, the central location 101 can create and/or receive applications, such as interactive applications. Such applications can be related to particular content.

The central location 101 can comprise one or a plurality of receivers 111a, 111b, 111c, 111d that are each associated with an input source. For example, MPEG encoders, such as encoder 112, are included for encoding local content or a video camera 109 feed. A switch 113 can provide access to server 110, which can be a Pay-Per-View server, a data server, an internet router, a network system, a phone system, and the like. Some signals may require additional processing, such as signal multiplexing, prior to being modulated. Such multiplexing can be performed by multiplexer (mux) 114.

The central location 101 can comprise one or a plurality of modulators 115 for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of network 100. The control system 118 can interface, monitor, and/or control a variety of functions, including, but not limited to, the channel lineup for the television system, billing for each user, conditional access for content distributed to users, and the like. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, there may be an interface comprising a decoder 120, such as a gateway or communications terminal (CT) can decode, if needed, the signals for display on a display device 121, such as on a television set (TV) or a computer monitor. Various wireless devices may also be connected to the network at, or proximate, user location 119. Those skilled in the art will appreciate that the signal can be decoded in a variety of equipment, including a CT, a computer, a TV, a monitor, or satellite dish. In an exemplary aspect, the methods and systems disclosed can be located within, or performed on, one or more CT's 120, display devices 121, central locations 101, DVR's, home theater PC's, and the like. As an example, a storage device 122 can be in communication with one or more of the CT 120, the display device 121, and the central location 101 to send/receive content therebetween. As a further example, the storage device 122 can be located remotely from the user location 119, such as network storage. In an aspect, a software such as operating software, control software, or application software can be stored on the storage device 122.

In an aspect, user location 119 is not fixed. By way of example, a user can receive content from the distribution system 116 on a mobile device such as a laptop computer, PDA, smartphone, GPS, vehicle entertainment system, portable media player, and the like.

In an aspect, a user device 124 can receive signals from the distribution system 116 for rendering content on the user device 124. As an example, rendering content can comprise providing audio and/or video, displaying images, facilitating an audio or visual feedback, tactile feedback, and the like. However, other content can be rendered via the user device 124. In an aspect, the user device 124 can be an CT, a set-top box, a television, a computer, a smartphone, a laptop, a tablet, a multimedia playback device, a portable electronic device, and the like. As an example, the user device 124 can be an Internet Protocol compatible device for receiving signals via a network 125 such as the Internet or some other communications network for providing content to the user. As another example, the user device 124 can be configured as a second screen device. As a further example, the user device 124 can be configured to supplement content presented via the display 121. It is understood that other display devices and networks can be used. It is further understood that the user device 124 can be a widget or a virtual device for displaying content in a picture-in-picture environment such as on the display device 121, for example.

In an aspect, one or more of the CT 120 and the user device 124 can comprise a user interface 126. As an example, the user interface 124 can user facilitate interaction between a user and one or more of the CT 120 and the user device 124. As a further example, the user interface 126 can provide feedback to the user. In an aspect, the user interface 126 can receive an input, allowing the users to manipulate control functions associated with the one or more of the CT 120 and the user device 124. As an example, the user interface 126 can provide an output, allowing the one or more of the CT 120 and the user device 124 to indicate the effects of the received input. As a further example, the user interface 126 can present content such as program guide listings and related information.

In an aspect, the user interface 126 can obtain program guide listings from an electronic program listing database 128 and display the program guide listings. The user interface 126 can display program guide information for programs that are available for viewing on the mobile terminal at that time. The user interface 126 can display program guide information listings for multiple programs one after another and may display each program guide listing for a predetermined time range. A user may specify and store personal interest rules for the user interface 126 to alert the user when the user interface 126 is displaying information for a certain program, or for a certain genre of program.

In an aspect, the methods and systems can provide an integrated presentation of content with program guide information. As an example, the methods and systems can provide an enhanced content guide, e.g., via the user interface 126, comprising supplemental content information relating to content such as media programs. As a further example, the methods and systems provide supplemental content information such as program description, reviews, social commentary, and/or content statistics. In an aspect, the methods and systems can provide a unique user experience by presenting icons, images, audio, colorization, and/or visual effects to represent the supplemental information.

Figure 2:
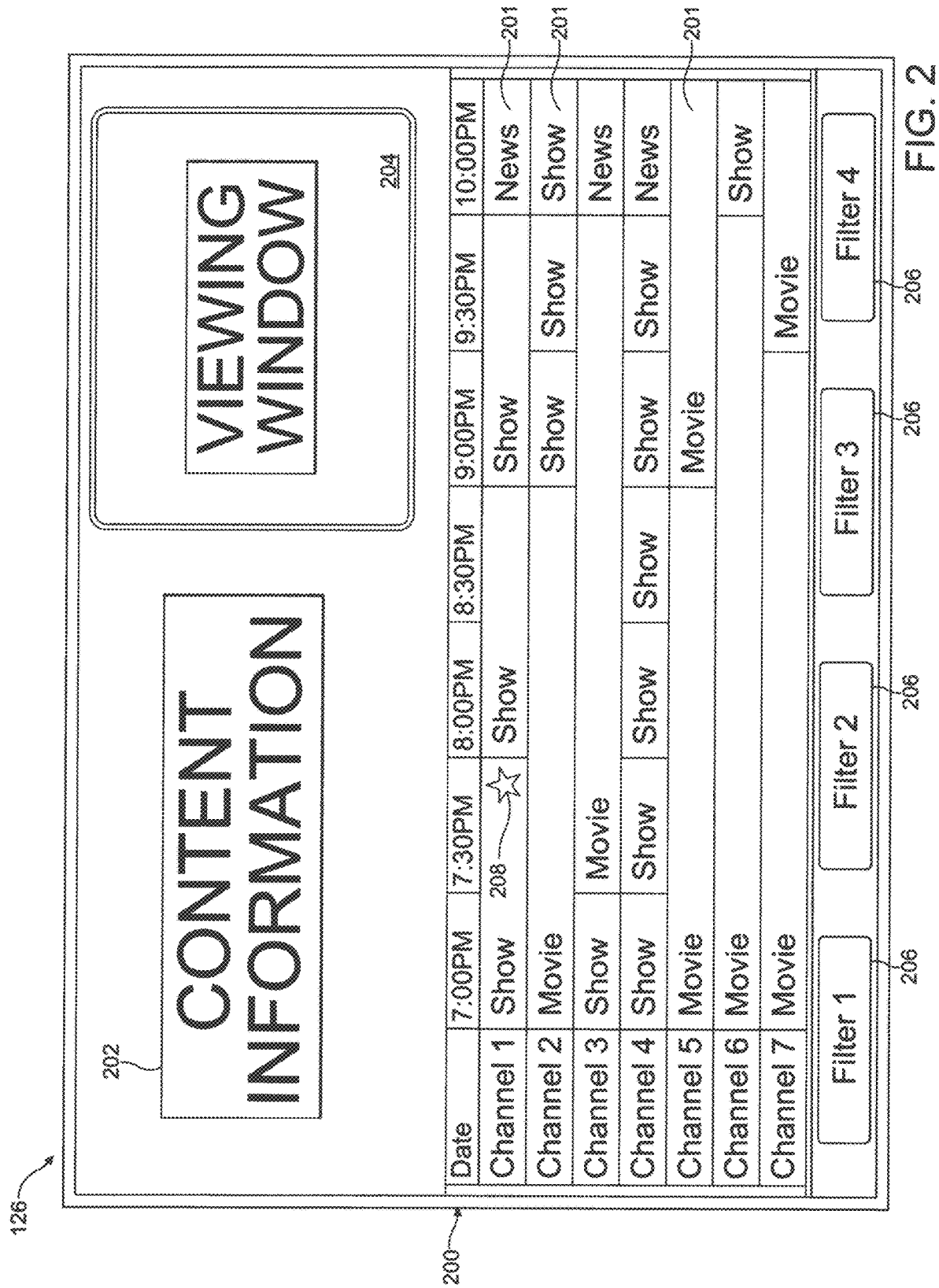
FIG. 2 is a graphical representation of an exemplary user interface.

FIG. 2 illustrates an example of the user interface 126. In an aspect, the user interface 126 can comprise an interface such as content guide 200. As an example, the content guide 200 can present program guide information to a user. As another example, portions of the content guide 200 can be presented in a grid configuration. As a further example, the content guide 200 can present the program guide information and/or other content in a grid-like configuration. In an aspect, the grid-like configuration of the content guide 200 can comprise selectable and/or searchable entries 201 or listings. A user can interact with the content guide 200 to search the available content, such as one or more of the entries 201 for presentation. As an example, a user can use a controller (not shown) to select and/or highlight a particular available programming, such as a television show, movie, music, or other content or entries 201, for presentation.

In an aspect, the user interface 126 can present content information 202 to a user. As an example, the content information 202 can comprise commentary, supplemental information, popularity information, statistical information, and/or classifiers relating to content such as images, audio, video, text, user contacts, user profiles, buddy lists, playlists, social networks, commentary, and the like. As a further example, the content information 202 can be contextually related to content displayed via the content guide 200. In an aspect, the user interface 126 can be presented via a second device (e.g., second screen device), wherein the user interface 126 can present information relating to content presented via a first device.

The content information 202 can comprise a social media feed displayed on the user interface 126 and/or in conjunction with the content guide 200. For example, the social media feed can be displayed as a closed caption streaming banner, while related content is being displayed via the content guide 200. Accordingly, members of a particular social media group can comment among themselves about the content. As a further example, the social media feed can be presented on the user device 124 while related content is being presented via the display 122.

In an aspect, the social media feed can be filtered to prevent certain content from being presented. As an example, parental control locks can be configured to filter the content presented via the social media feed. As a further example, content presented via the social media feed can be configured based upon pre-defined parameters. In an aspect, the parameters for configuring the social media feed can comprise classifying content. As an example, content presented via the social media feed can be classified by related actors, genre, mood, social commentary, and the like.

In an aspect, the user interface 126 can comprise a viewing window 204. As an example, the viewing window 204 can display information such as video content, text, images, and the like relating to content displayed via the content guide 200. As a further example, the viewing window 204 can present a preview of content to a user when a user selects and/or highlights a particular one of the listings 201 of the content guide 204.

In an aspect, the user interface 126 can comprise one or more filters 206. As an example, the filters can block or allow certain content information 202, content, and/or indicators. As a further example, an indicator 208 can be presented or hidden based upon the selection of one or more of the filters 206. In an aspect, a first one of the filters 206 can be associated with commentary from members of a particular social network. Accordingly, when the first one of the filters is selected, the commentary such as user comments, posts, feedback, communications, and the like, can be presented via the user interface 126. However, when the first one of the filters 206 is not selected, the commentary may not be presented. In an aspect, a second one of the filters 206 can be associated with statistics such as a number of current viewers (e.g., Nielsen rating) of a particular content program. Accordingly, when the second one of the filters 206 is selected, the statistics can be presented via the user interface 126. However, when the second one of the filters 206 is not selected, the statistics may not be presented.

Figure 3:
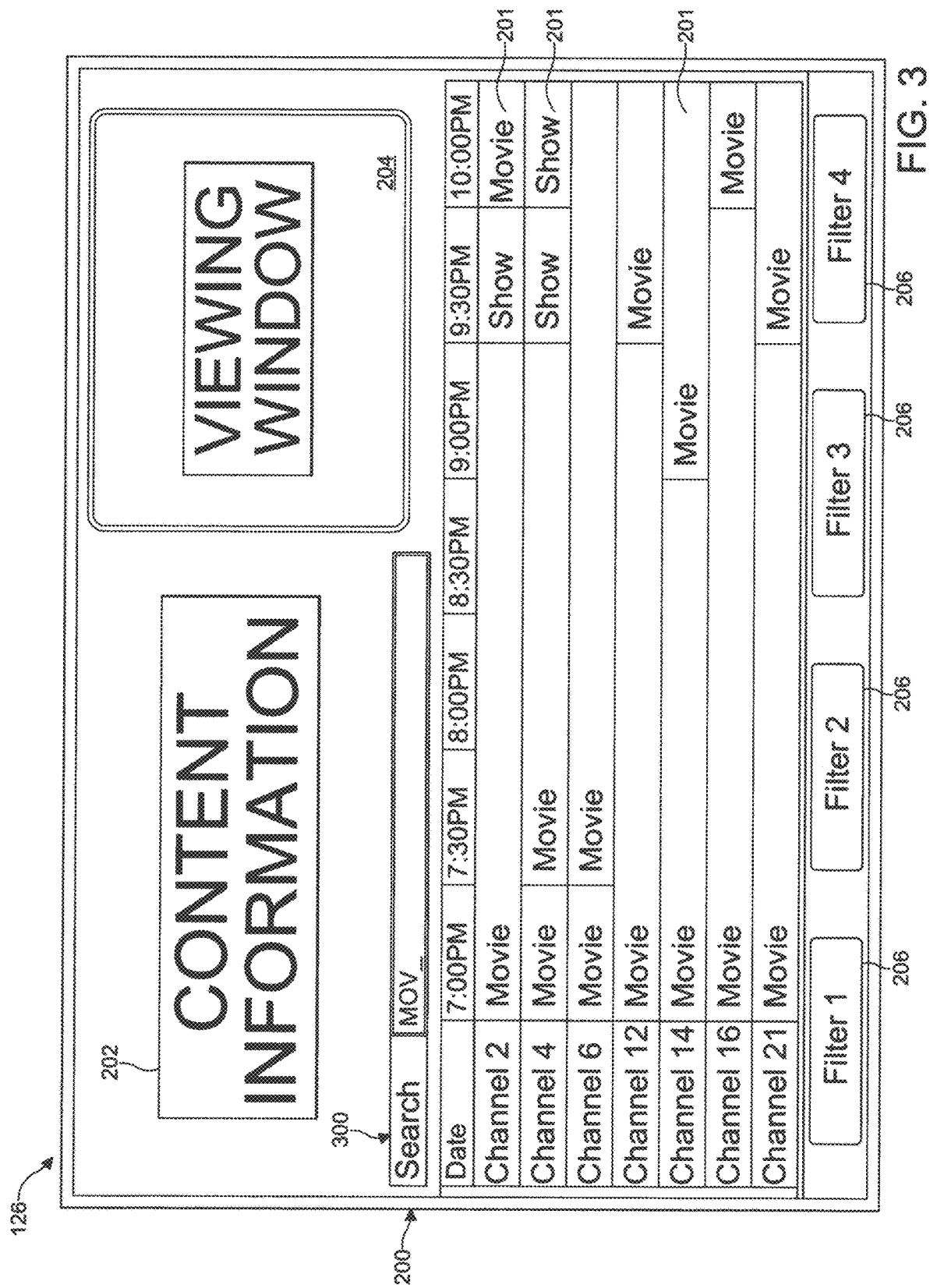
FIG. 3 is a graphical representation of an exemplary user interface.

FIG. 3 illustrates an example of the user interface 126. The user interface 126 illustrated in FIG. 3 will be discussed, for example, in reference to FIGS. 1-2. In an aspect, the user interface 126 can comprise a search element 300. The search element 300 can be configured to receive a search term such as by typing the search term in a dialog box associated with the search element 300. In an aspect, the search element 300 can be a type of filter element, such as filter elements 206 (FIG. 2) for allowing and/or blocking content. As an example, the search element 300 can be presented in conjunction with an interface such as the content guide 200. As a further example, the content guide 200 can be presented as a grid. In an aspect, when a search term is provided to the search element 300, the content guide 200 can be automatically filtered by the search term. For example, as a user types the word "MOVIE" into the search element 200, the content guide 200 would automatically limit content presented via the content guide 200 to programs that are classified as "movies," as shown in FIG. 3. As another example, as a user types the word "STAR" into the search element 200, the content guide 200 would automatically limit content presented via the content guide 200 to programs that begin with "STAR" (e.g., Star Trek, Star Wars, etc). As a further example, as a user types the time "9:00" into the search element 200, the content guide 200 would automatically limit content presented via the content guide 200 to programs that are available at 9:00 pm and 9:00 am. Any number of free form search terms can be provided to the search element 300.

Figure 4:
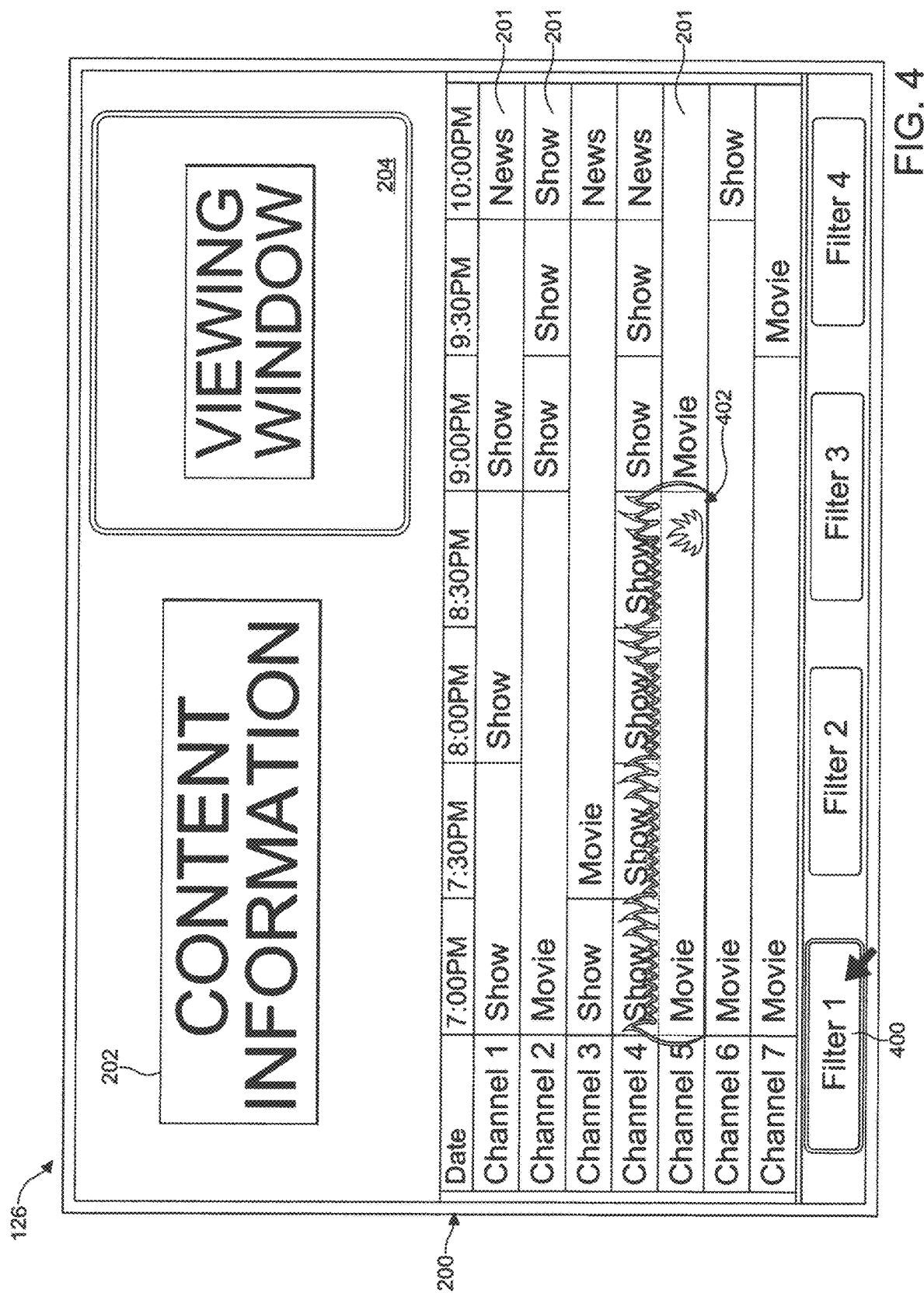
FIG. 4 is a graphical representation of an exemplary user interface.

FIG. 4 illustrates an example of the user interface 126. The user interface 126 illustrated in FIG. 4 will be discussed, for example, in reference to FIGS. 1-2. In an aspect, the user interface 126 can comprise a filter element 400. Filter element 400 can be one of the filter elements 206 (FIG. 2) or similar thereto. As an example, the filter element 400 can be associated with statistics such as a number of current viewers (e.g., Nielsen rating) of a particular content program. Accordingly, when the filter element 400 is selected, the statistics can be presented via the user interface 126. However, when the filter element 400 is not selected, the statistics may not be presented.

In an aspect, when the filter element 400 is selected, an indicator 402 can be presented. As an example, the indicator 402 can be a visual effect or image. As a further example, the indicator 402 can comprise a heat map. In an aspect, the indicator 402 can comprise colors such as red and/or icons such as flames to indicate extremely popular or hot shows, as shown in FIG. 4. As an example, any visual effect, icons, and/or images can be presented to represent any supplemental information such as content statistics, popularity, and the like. As a further example, information relating to the number of user tuning into a particular program can be collected and/or aggregated to represent a popularity trend. Such a trend can be represented by the indicator 402 to provide a unique user experience, as well as, supplemental information (e.g., popularity) relating to content such as images, audio, video, social commentary, media, and the like.

Figure 5A:
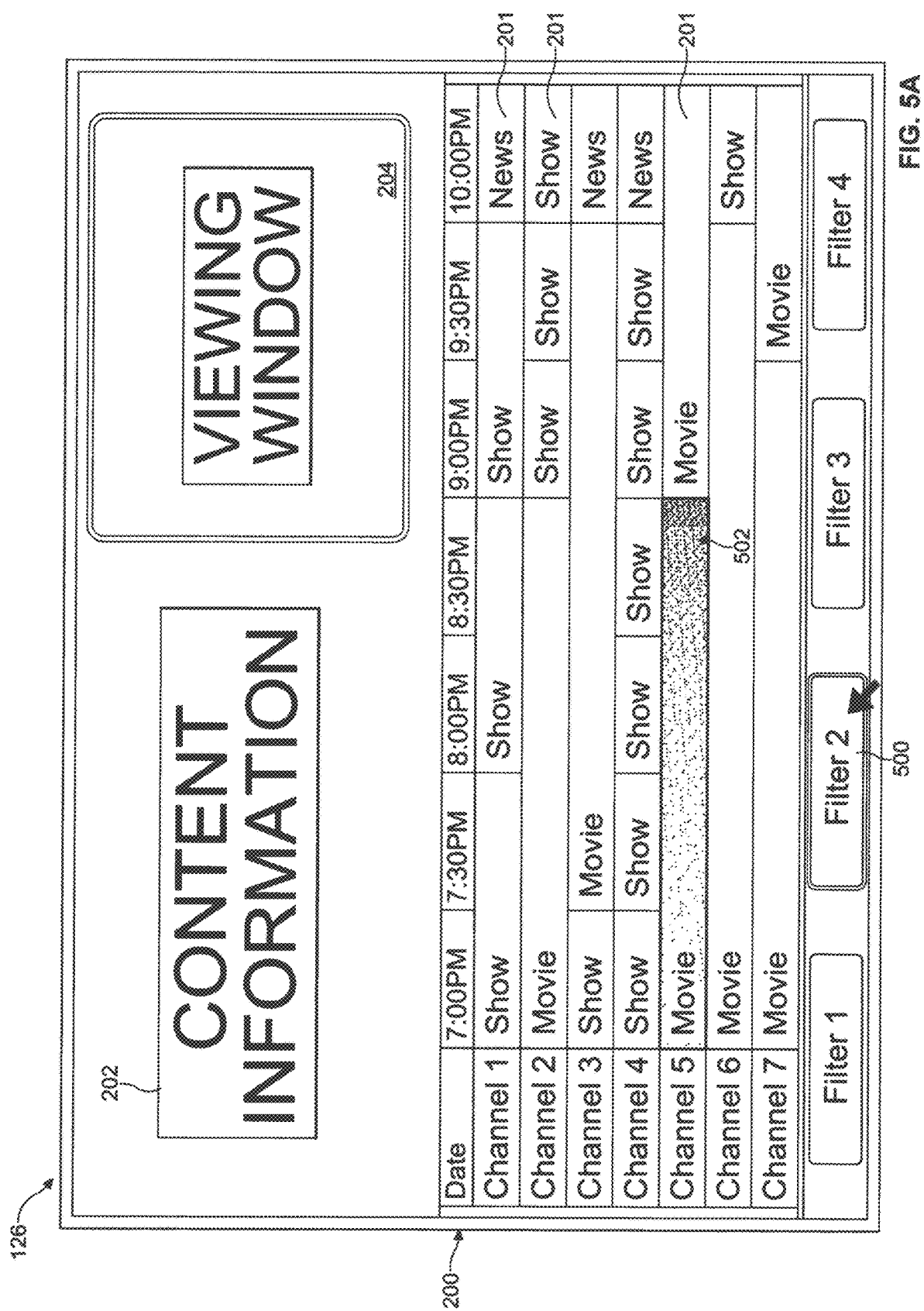
FIG. 5A is a graphical representation of an exemplary user interface.
Figure 5B:
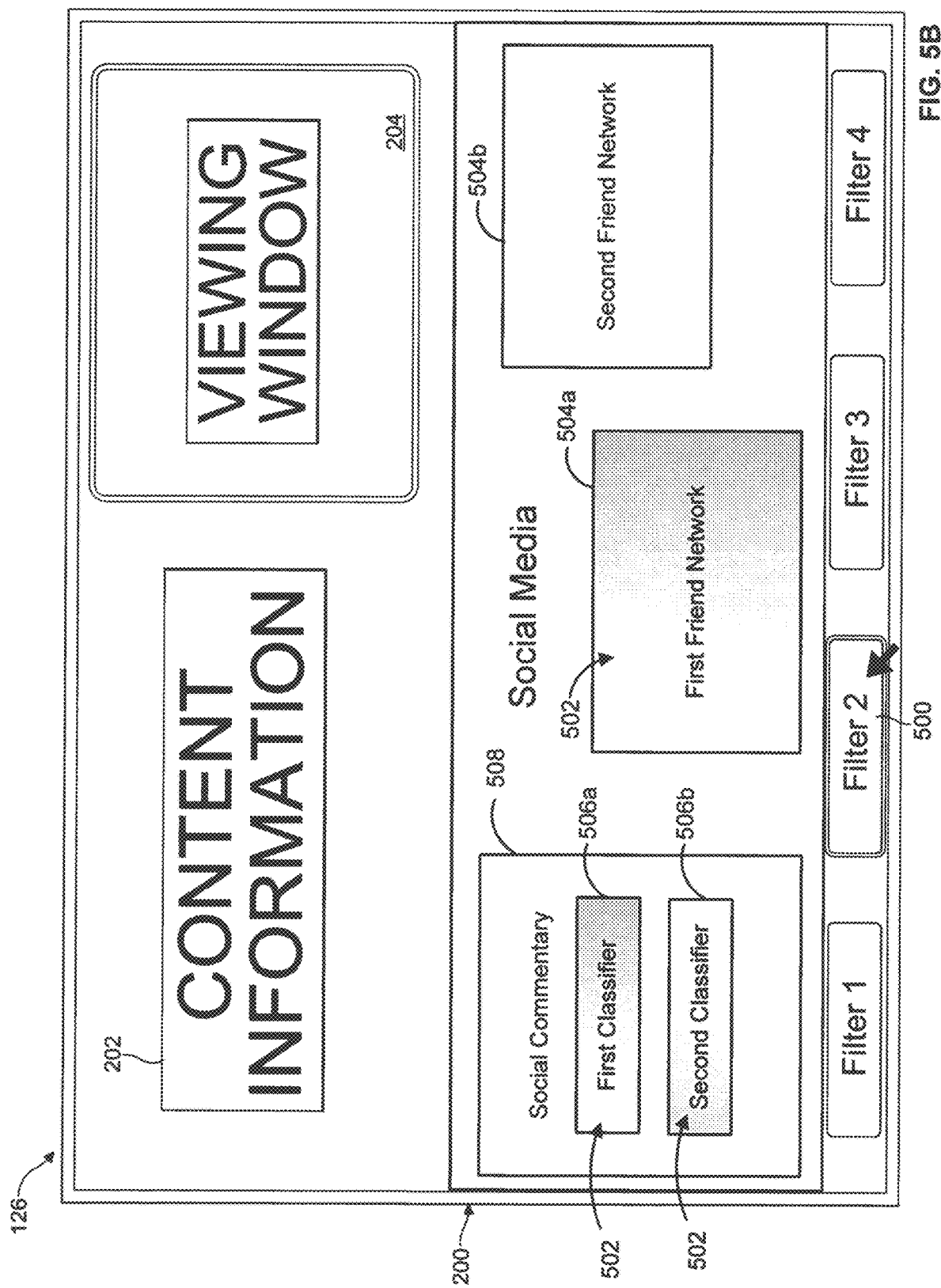
FIG. 5B is a graphical representation of an exemplary user interface.

FIGS. 5A-5B illustrate examples of the user interface 126. The user interface 126 illustrated in FIGS. 5A-5B will be discussed, for example, in reference to FIGS. 1-2. In an aspect, the user interface 126 can comprise a filter element 500. Filter element 500 can be one of the filter elements 206 (FIG. 2) or similar thereto. As an example, the filter element 500 can be associated with information collected from a pre-defined group of users such as a social network, buddy list, or contacts database. Accordingly, when the filter element 500 is selected, the information collected from a pre-defined group of users can be presented via the user interface 126. However, when the filter element 500 is not selected, the information collected from a pre-defined group of users may not be presented.

In an aspect, when the filter element 500 is selected, an indicator 502 can be presented. As an example, the indicator 502 can be a visual effect or image. As a further example, the indicator 502 can comprise a color gradient to indicate trends. As an example, any visual effect, icons, and/or images can be presented to represent any supplemental information such as content statistics, popularity, and the like. As a further example, information relating to the reviews provided by members of a particular group can be collected and/or aggregated to represent a likeability or trend relating to content. Such a trend can be represented by the indicator 502 to provide a unique user experience, as well as, supplemental information (e.g., trend data, likeability, user reviews) relating to content. In an aspect, the indicator 502 can represent a temporal trend in the supplemental information. For example, when a particular content program is gaining likeability, a density of a color gradient can increase. Other visual effects, colors, and images can be used to represent supplemental content information. In an aspect, audio effects can be used to represent supplemental content information and to provide a unique user experience. As an example, an audio effect such as a tone, voice, sound, or sequence of sounds, or the like, can be used when a user highlights certain content, the audio effect indicating supplemental information (e.g., trend data, likeability, popularity, etc.).

As more clearly shown in FIG. 5B, the indicator 502 can indicate information relating to social networking. As an example, trending information for one or more friend networks 504a, 504b can be represented by the indicator 502. As another example, the popularity of one or more classifiers 506a, 506b of social commentary 508 can be represented by the indicator 502. As a further example, the classifiers 506a, 506b can comprise topics, threads, location, groups of users/devices, and the like. Other filters and indicators can be applied to social networking information.

Figure 6:
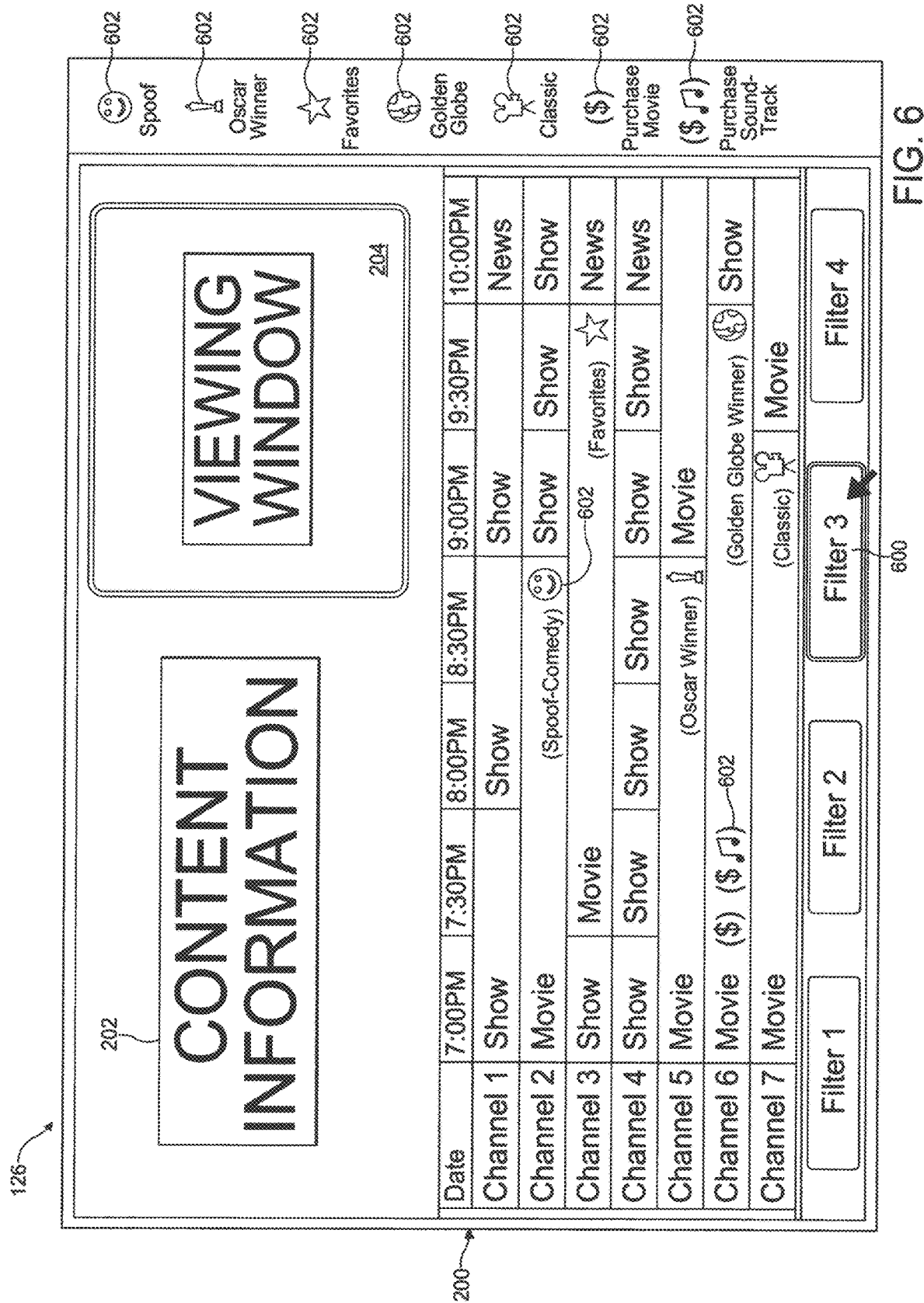
FIG. 6 is a graphical representation of an exemplary user interface.

FIG. 6 illustrates an example of the user interface 126. The user interface 126 illustrated in FIG. 6 will be discussed, for example, in reference to FIGS. 1-2. In an aspect, the user interface 126 can comprise a filter element 600. Filter element 600 can be one of the filter elements 206 (FIG. 2) or similar thereto. As an example, the filter element 600 can be associated with supplemental information such as content classifiers, historical information, awards, commentary, mood, and the like. Accordingly, when the filter element 600 is selected, the supplemental information can be presented via the user interface 126. However, when the filter element 600 is not selected, the supplemental information may not be presented.

In an aspect, when the filter element 600 is selected, one or more indicators 602 can be presented. As an example, the indicators 602 can be a visual effect or images. As a further example, the indicators 602 can comprise one or more visual icons, as shown in FIG. 6. In an aspect, any visual effect, icons, and/or images can be presented to represent any supplemental information such as content classifiers, historical information, awards, commentary, mood, and the like. As an example, the indicators 602 can represent a number of times a particular content program has been watched and the watch rates by one or more users. As a further example, the indicators 602 can represent a content classifier such as classic content, cult status, viral status, Oscar nominated, Oscar winner, Golden Globe Nominated, Golden Globe winner, Emmy nominated, Emmy winner, and the like. In an aspect, the indicators 602 can represent whether a parody, remake, and/or spoof of a particular content program has been created and/or is available (e.g., on another channel, on-demand, or stored recording).

In an aspect, the indicators 602 can represent recommendations, favorite content, shared content, or the like. As an example, one or more of the indicators 602 can highlight in a particular color, content entries that have been watched and can highlight other content entries that have not been watched. As a further example, one or more of the indicators 602 can represent recommendations from various sources such as user groups, social networks, and the like. In an aspect, the one or more of the indicators 602 can be password protected such that the presentation of the one or more of the indicators 602 is controlled by authentication of a password. As an example, the indicators 602 can be distinguished, such as by color, based upon the source of the supplemental information. As a further example, the indicators 602 can be distinguished, such as by color, based upon the device presenting the user interface 126. As such, a device located in a child's room can present different personal recommendations than a device located in the parents' bedroom.

In an aspect, one or more of the indicators 602 can represent supplemental information available for presentation, purchase, and/or rental. For example, one or more of the indicators 602 can represent a soundtrack relating to one or more entries 201 presented via the content guide 200. As a further example, when a user is watching a movie and hears a particular song, the user may engage one or more of the indicators 602. Accordingly, the user can be directed to a service for purchasing the soundtrack associated with the movie. In an aspect, one or more of the indicators 602 can represent the ability to purchase and gift video on-demand (VOD) content to another person (e.g., a friend, family, and/or someone in the user's social media network). Content purchase and/or gifting, for example, can be accomplished by transmitting a token and/or other suitable indication to the user or recipient of the gift.

Figure 7:
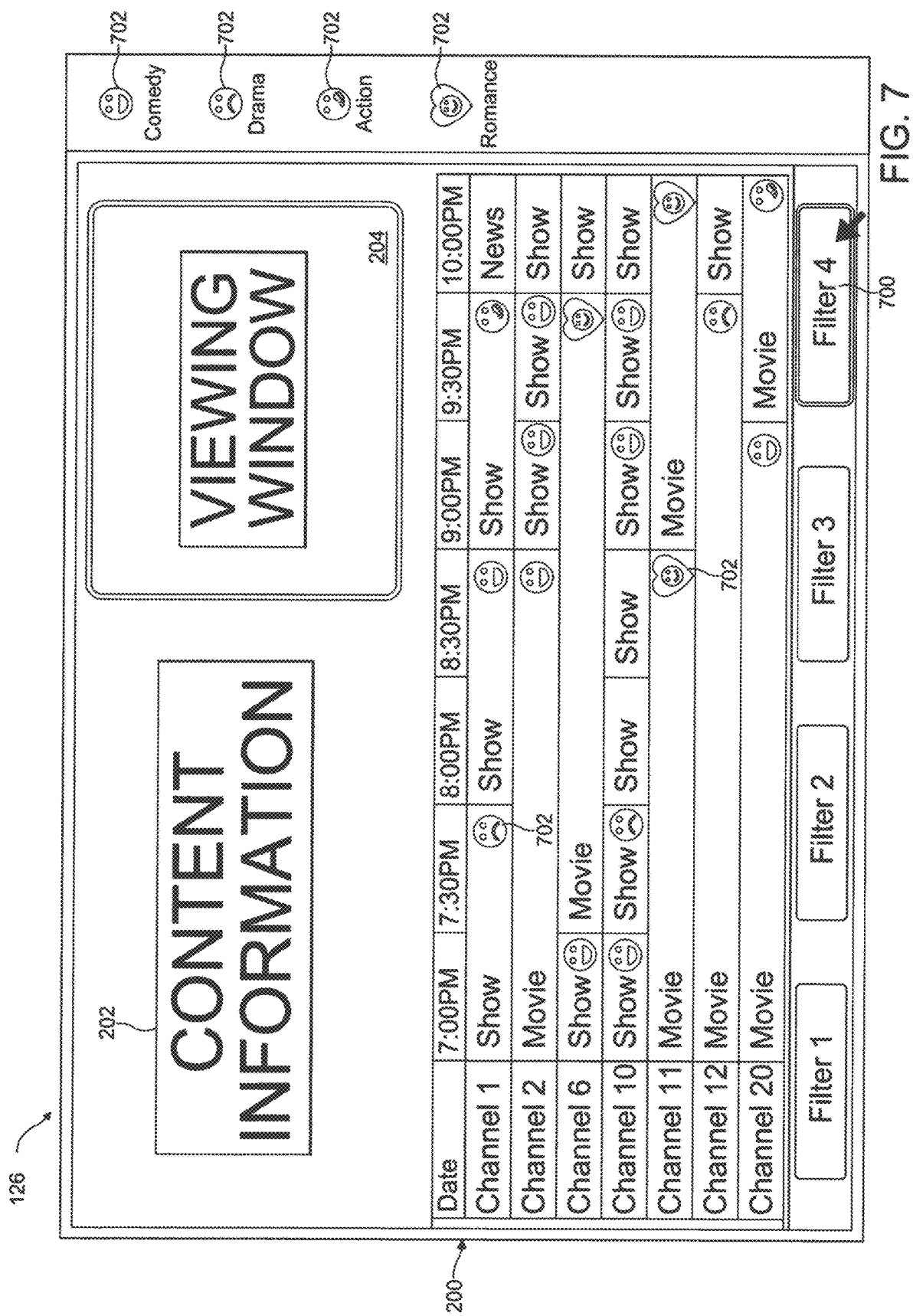
FIG. 7 is a graphical representation of an exemplary user interface.

FIG. 7 illustrates an example of the user interface 126. The user interface 126 illustrated in FIG. 7 will be discussed, for example, in reference to FIGS. 1-2. In an aspect, the user interface 126 can comprise a filter element 700. Filter element 700 can be one of the filter elements 206 (FIG. 2) or similar thereto. As an example, the filter element 700 can be associated with supplemental information such as mood relating to a particular content program or programs. Accordingly, when the filter element 700 is selected, the supplemental information can be presented via the user interface 126. However, when the filter element 700 is not selected, the supplemental information may not be presented.

In an aspect, when the filter element 700 is selected, one or more indicators 702 can be presented. As an example, the indicators 702 can be a visual effect or image. As a further example, the indicators 702 can comprise one or more visual icons. In an aspect, any visual effect, icons, and/or images can be presented to represent any supplemental information such as content classifiers, historical information, awards, commentary, and the like. As an example, the indicators 702 can represent a mood classifier relating to a particular content program.

In an aspect, one or more of the indicators 702 (e.g., mood classifiers), can be used to classify one or more entries 201 presented via the user interface 200. For example, one or more of the indicators 702 can relate to a user's mood such as happy, sad, nostalgic, angry, depressed, romantic, and the like. As a further example, one or more of the indicators 702 can relate to a user environment such as date night, first date, slumber party, holiday, and the like. In an aspect, one or more of the indicators 702 can be filtered based on time of day, device in use, device location, past consumption, and the like.

Figure 8:
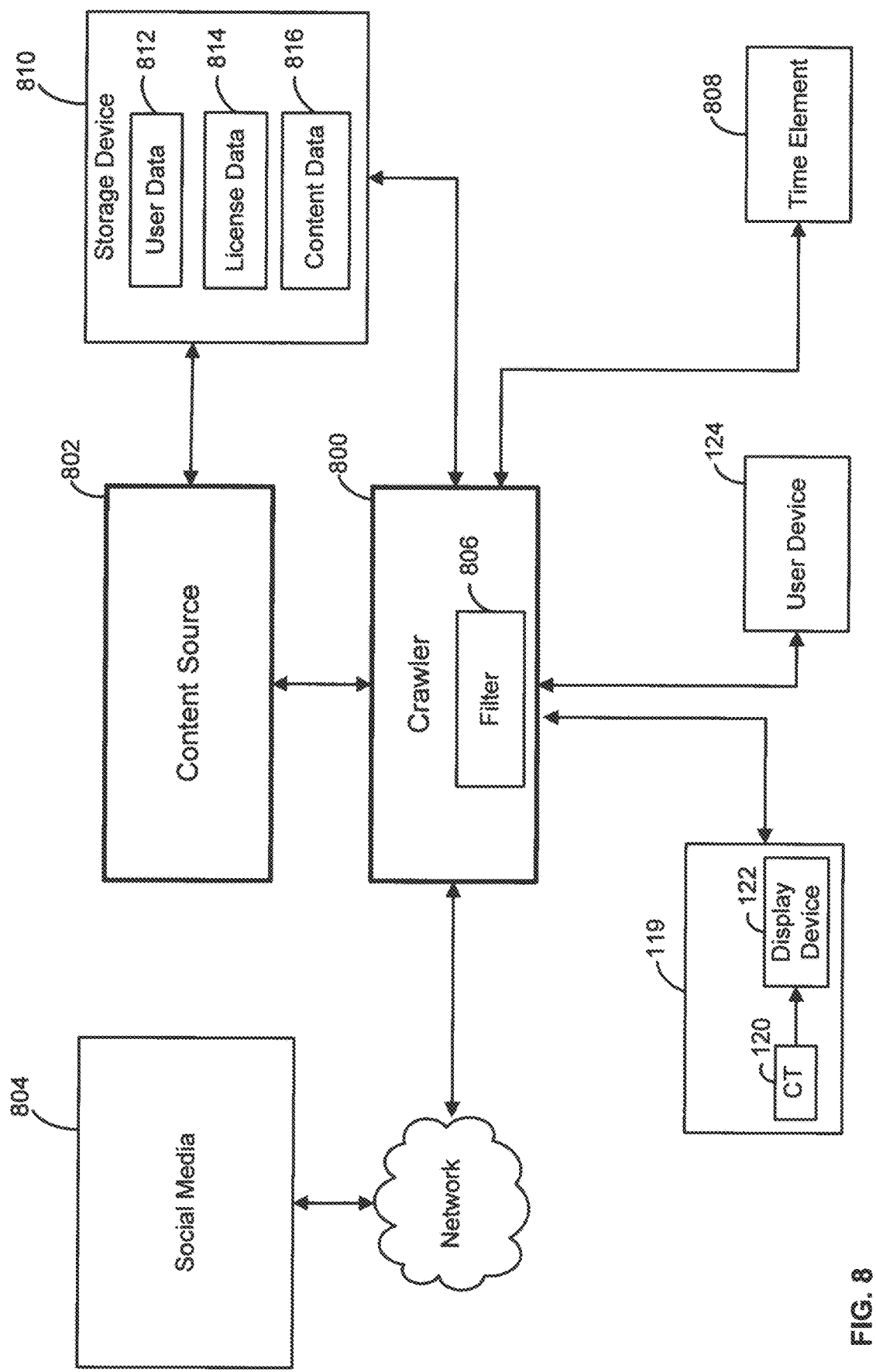
FIG. 8 is a block diagram of an exemplary system and network.

FIG. 8 illustrates an exemplary system and network. In an aspect, a crawler 800 can be in communication with one or more of the CT 120, the user device 124, the Internet, and/or a communication network to receive information relating to content being delivered to a particular user. As an example, the crawler 800 can comprise a web crawler, such as a computer program that browses a network (e.g., Internet) in a methodical, automated manner to retrieve such supplemental content information. In an aspect, the crawler 800 can be in communication with one or more content sources 802 and/or networks, such as a social network 804 to transmit and/or receive content and supplemental content information. As an example, the crawler 800 can comprise a filter element 806 to classify, block, and/or allow content and/or supplemental content information to be transmitted through the crawler 800. As a further example, the crawler 800 can comprise an ant, automatic indexer, bot, Web spider, Web robot, and the like.

In an aspect, a time element 808 can be in communication with one or more of the crawler 800 to provide a timing reference thereto. As an example, the time element 808 can be a clock. As a further example, the time element 808 can transmit information to the crawler 800 for associating a time stamp with a particular event received by the crawler 800. In an aspect, the crawler 800 can cooperate with the time element 808 to associate a time stamp with events having an effect on the content delivered to the CT 120 and/or the user device 124, such as, for example, license request, license grant, subscription life-cycle, license denial, a channel tune, a remote tune, remote control events, playpoint audits, playback events, program events including a program start time and/or end time and/or a commercial/intermission time, and/or playlist timing events, and the like.

In an aspect, a storage device 810 can be in communication with the crawler 800 to store and/or retrieve data to/from the storage device 810. As an example, the storage device 810 can store data relating to user data 812, license data 814, and/or content data 816 relating to content transmitted or scheduled to be transmitted to the CT 120 and/or the user device 124.

In an aspect, the user data 812 can comprise information relating to relating to users, user preferences, and user devices and configurations, permissions and/or entitlements associated with a particular user and/or device. As an example, the user data 812 can comprise information, such as pre-configured settings, subscription information, identification information, location information, and/or timing information relating to a particular user or user device. In an aspect, the user data 812 can be associated with one or more content sources 802, 804. As a further example, the user data 812 can have time stamps or markers associated therewith.

In an aspect, the license data 814 can comprise information relating to the permissions and/or entitlements associated with a particular user and/or device. As an example, the license data 814 can comprise information relating to the access control management for a particular device and/or formatted system or software. In an aspect, the license data 814 can be associated with one or more content sources 802, 804 and/or a content consumer (e.g., content player, encoder, rendering system, etc.). As a further example, the license data 814 can have time stamps or markers associated therewith. The storage device 810 can store information relating to users, user preferences, and user devices and configurations.

In an aspect, the content data 816 can comprise information relating to the content and/or supplemental content information available to be presented to a user. As an example, the content data 816 can comprise information, such as subscription information, identification information, statistical information, commentary, reviews, location information, timing information, and/or supplemental content information relating to a particular content, media, and/or programming. In an aspect, the content data 816 can be associated with one or more content sources 802, 804. As a further example, the content data 816 can have time stamps or markers associated therewith. The storage device 810 can store information relating to content, entitlement, users, devices and configurations relating to the same.

In an aspect, the crawler 800 can search various sources of content and related information and can provide such information to the user interface 126. For example, when a user engages one or more filter elements 206, the content guide 200 can present supplemental information retrieved by the crawler 800. The supplemental information can be filtered such that the more relevant information is presented.

In an aspect, before, during, and/or after content presentation, the user can be presented with an opportunity to comment on and provide a review for the content presented. As an example, the crawler 800 can provide a link to services for storing and/or transmitting the collected comments and/or reviews. As a further example, the crawler 800 can search multiple information sources across the Internet and other networks to locate content purchasing information that may be available from different sources.

In an aspect, as one or more users can manage, exchange, distribute and/or view content at various locations, from various sources, with various access rights, the user interface 126 can integrate one or more indicators 208 (FIG. 2) representing particular actions taken at any location and/or on any device across. For example, if a user watches a program, that program is marked as being watched by that user but not as being watched by other members of the user's social network. As a further example, information relating to actions taken by any member of a user group or social network can be tracked and presented via the user interface 126.

Figure 9:
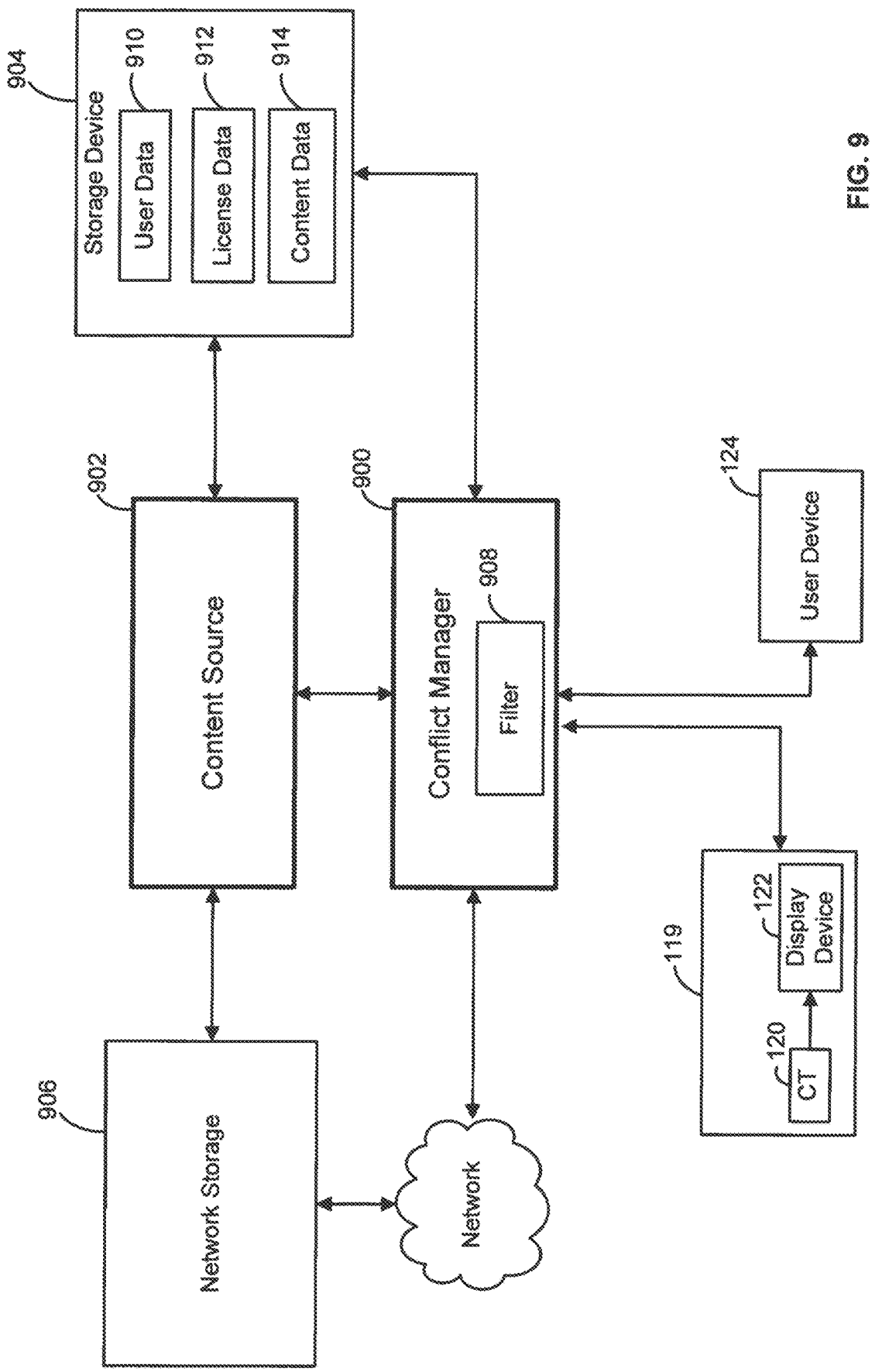
FIG. 9 is a block diagram of an exemplary system and network.

FIG. 9 illustrates an exemplary system and network. In an aspect, a conflict manager 900 can be in communication with one or more of the CT 120, the user device 124, the Internet, and/or a communication network to receive information relating to content being delivered to a particular user. As an example, the conflict manager 900 can comprise a computing device and/or computer program configured to monitor one or more devices and to provide conflict information on data stored on the one or more devices. In an aspect, the conflict manager 900 can be in communication with one or more content sources 902 and/or storage, such as a storage device 904 and network storage 906 to transmit and/or receive content and supplemental content information. As an example, the conflict manager 900 can comprise a filter element 908 to classify, block, and/or allow content to be transmitted through the conflict manager 900.

In an aspect, a storage device 904 can be in communication with the conflict manager 900 to store and/or retrieve data to/from the storage device 904. As an example, the storage device 904 can store data relating to user data 910, license data 912, and or content data 914 relating to content transmitted or scheduled to be transmitted to the CT 120 and/or the user device 124.

In an aspect, the user data 910 can comprise information relating to users, user preferences, and user devices and configurations, permissions and/or entitlements associated with a particular user and/or device. As an example, the user data 910 can comprise information, such as pre-configured settings, subscription information, identification information, location information, and/or timing information relating to a particular user or user device. In an aspect, the user data 910 can be associated with one or more content sources 902 and/or storage 904, 906. As a further example, the user data 910 can have time stamps or markers associated therewith.

In an aspect, the license data 912 can comprise information relating to the permissions and/or entitlements associated with a particular user and/or device. As an example, the license data 912 can comprise information relating to the access control management for a particular device and/or formatted system or software. In an aspect, the license data 912 can be associated with one or more content sources 902, 906 and/or a content consumer (e.g., content player, encoder, rendering system, etc.). As a further example, the license data 912 can have time stamps or markers associated therewith. The storage device 904 can store information relating to users, user preferences, and user devices and configurations.

In an aspect, the content data 914 can comprise information relating to the content and/or supplemental content information available to be presented to a user. As an example, the content data 914 can comprise information, such as video data, audio data, subscription information, identification information, statistical information, commentary, reviews, location information, timing information, and/or supplemental content information relating to a particular content, media, and/or programming. In an aspect, the content data 914 can be associated with one or more content sources 902, 906. As a further example, the content data 914 can have time stamps or markers associated therewith. The storage device 904 can store information relating to content, entitlement, users, devices and configurations relating to the same.

In an aspect, conflict manager 900 can be configured to resolve content recording conflicts. For example, when a user selects a content program field to record and the content program relating to the field is not available, because the device has no available tuners, no data flow capacity, the program is not yet available/released, or the like, a recommendation can be generated by the conflict manager 900. As a further example, the conflict manager can provide an alternate timeslot, media, and/or mechanism to record/purchase the program or alternate programs (e.g., related programs).

In an aspect, conflict manager 900 can be configured to monitor one or more devices to determine whether particular content is recorded on a device by the same and/or a different user and/or whether the content is dynamically available for download from an Internet source subscribed to by the user. As an example, conflict manager 900 can track viewing habits for one or more users on one or more devices. In an aspect, when content is selected to be recorded on a first user device, the conflict manager 900 can determine if the selected content is already stored on another user device. As an example, the conflict manager 900 can authenticate one or more users. As a further example, sensors, such as a finger print scanner, thumbprint reader, or other identification device, can be used on a remote control or user device to identify a particular user. As such, information relating to an identified and/or authenticated user can be collected and classified.

Figure 10A:
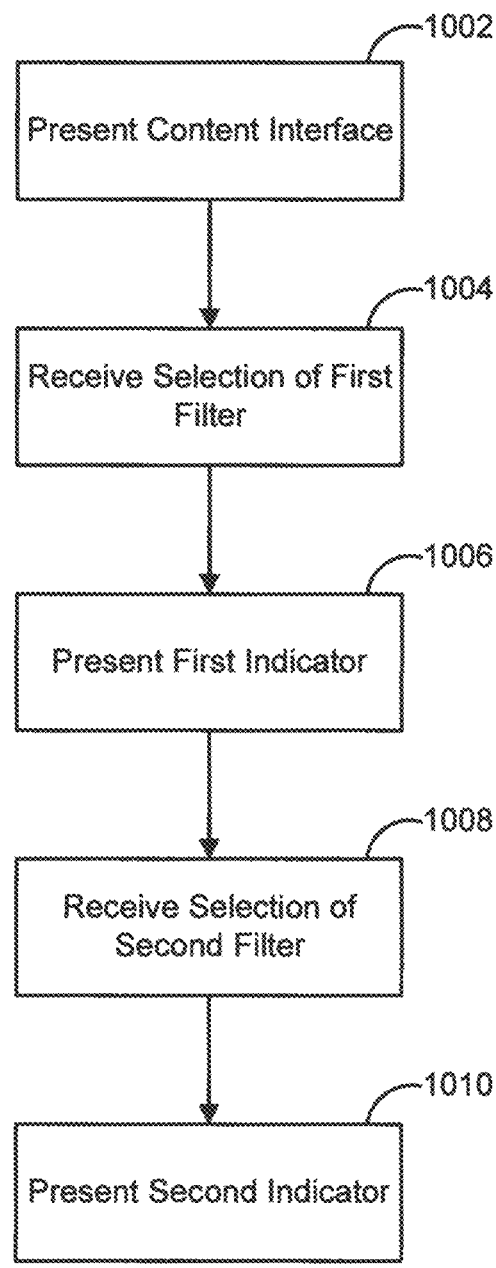
FIG. 10A is a flow chart of an exemplary method.

FIG. 10A illustrates an exemplary method for presenting content. In step 1002, an interface such as a content guide can be presented. In an aspect, the content guide can comprise one or more listings relating to content such as television show, movies, news, sports, video, images, music, and other media. As an example, one or more filters can be presented with the content guide. As a further example, the content guide can comprise the filters. However, the filters can be presented adjacent the content guide or on a second screen device remote from the presentation of the content guide, for example.

In step 1004, a selection of one or more of the filters, or parameters represented by the filters, can be received. In an aspect, a user can select one or more of the filters. As an example, selection of one or more of the filters can be facilitated by a controller. As a further example, selection of one or more of the filters can be received by a computing device such as CT 120 and/or the user device 124.

In step 1006, a first indicator can be presented. The first indicator can be an image, text, colorization, icon, video, audio, and the like. In an aspect, the first indicator can represent first information such as content information. As an example, the first indicator can be presented in response to a selection of a first one of the filters. As a further example, the first information relates to one or more entries presented in the content guide.

In an aspect, the first information can comprise content commentary. As an example, the content commentary can be classified based upon a source of the commentary or a source identifier relating to the source of the commentary. In an aspect, the first information can relate to popularity of particular content. As an example, the first information can comprise current viewing statistics of particular content. As a further example, the first information can relate to a mood of a user. In an aspect, the first information can comprise supplemental information relating to particular content. As an example, the supplemental information can contextually relate to the particular content.

In step 1008, a selection of one or more of the filters, or parameters represented by the filters, can be received. In an aspect, a user can select one or more of the filters. As an example, selection of one or more of the filters can be facilitated by a controller. As a further example, selection of one or more of the filters can be received by a computing device such as CT 120 and/or the user device 124.

In step 1010, a second indicator can be presented. The second indicator can be an image, text, colorization, icon, video, audio, and the like. In an aspect, the second indicator can represent second information such as content information. As an example, the second indicator can be presented in response to a selection of a second one of the filters. As a further example, the second information relates to one or more entries presented in the content guide.

In an aspect, the second information can comprise content commentary. As an example, the content commentary can be classified based upon a source of the commentary or a source identifier relating to the source of the commentary. In an aspect, the second information can relate to popularity of particular content. As an example, the second information can comprise current viewing statistics of particular content. As a further example, the second information can relate to a mood of a user. In an aspect, the second information can comprise supplemental information relating to particular content. As an example, the supplemental information can contextually relate to the particular content.

Figure 10B:
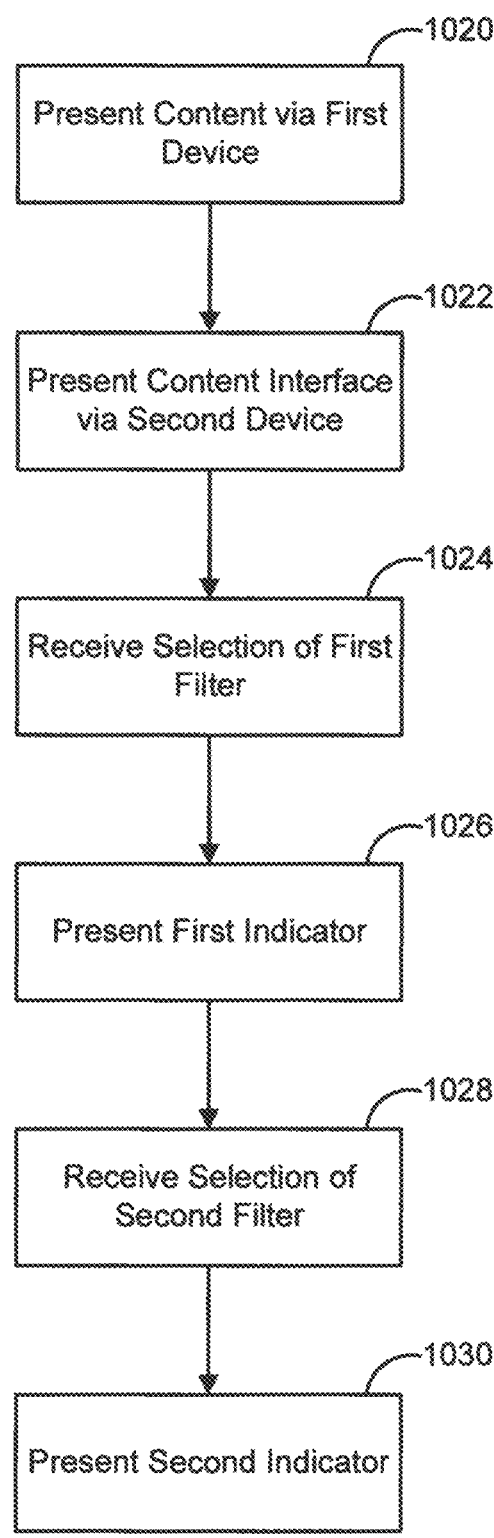
FIG. 10B is a flow chart of an exemplary method.

FIG. 10B illustrates an exemplary method for presenting content. In step 1020, content such as television show, social media, movies, news, sports, video, images, music, and other media can be presented via a first device such as a decoder, a display, a user device, and the like. In step 1022, an interface such as a content guide can be presented via a second device (e.g., a second screen device). In an aspect, the content guide can comprise one or more fields relating to content presented via the first device. As an example, one or more filters can be presented with the content guide. As a further example, the content guide can comprise the filters. However, the filters can be presented adjacent the content guide or on a second screen device remote from the presentation of the content guide, for example.

In step 1024, a selection of one or more of the filters, or parameters represented by the filters, can be received. In an aspect, a user can select one or more of the filters. As an example, selection of one or more of the filters can be facilitated by a controller. As a further example, selection of one or more of the filters can be received by a computing device such as CT 120 and/or the user device 124.

In step 1026, a first indicator can be presented. The first indicator can be an image, text, colorization, icon, video, audio, and the like. In an aspect, the first indicator can represent first information such as content information. As an example, the first indicator can be presented in response to a selection of a first one of the filters. As a further example, the first information relates to one or more entries presented in the content guide.

In an aspect, the first information can comprise content commentary. As an example, the content commentary can be classified based upon a source of the commentary or a source identifier relating to the source of the commentary. In an aspect, the first information can relate to popularity of particular content. As an example, the first information can comprise current viewing statistics of particular content. As a further example, the first information can relate to a mood of a user. In an aspect, the first information can comprise supplemental information relating to particular content. As an example, the supplemental information can contextually relate to the particular content.

In step 1028, a selection of one or more of the filters, or parameters represented by the filters, can be received. In an aspect, a user can select one or more of the filters. As an example, selection of one or more of the filters can be facilitated by a controller. As a further example, selection of one or more of the filters can be received by a computing device such as CT 120 and/or the user device 124.

In step 1030, a second indicator can be presented. The second indicator can be an image, text, colorization, icon, video, audio, and the like. In an aspect, the second indicator can represent second information such as content information. As an example, the second indicator can be presented in response to a selection of a second one of the filters. As a further example, the second information relates to one or more entries presented in the content guide.

In an aspect, the second information can comprise content commentary. As an example, the content commentary can be classified based upon a source of the commentary or a source identifier relating to the source of the commentary. In an aspect, the second information can relate to popularity of particular content. As an example, the second information can comprise current viewing statistics of particular content. As a further example, the second information can relate to a mood of a user. In an aspect, the second information can comprise supplemental information relating to particular content. As an example, the supplemental information can contextually relate to the particular content.

Figure 11:
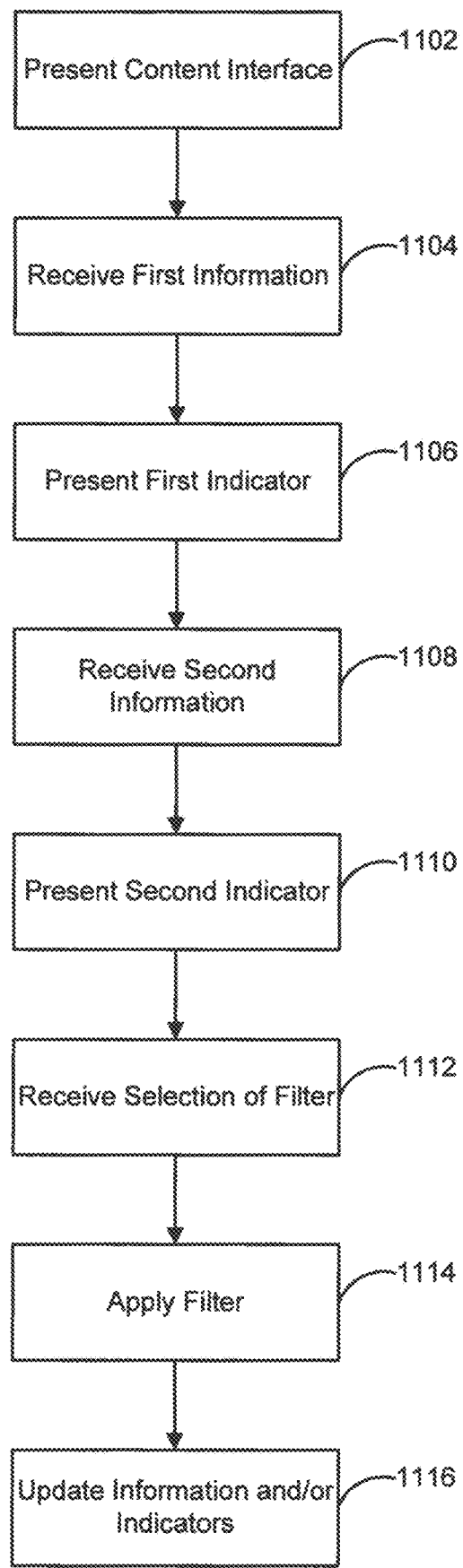
FIG. 11 is a flow chart of an exemplary method.

FIG. 11 illustrates an exemplary method for presenting content. In step 1102, an interface such as a content guide can be presented. In an aspect, the content guide can comprise one or more listings relating to content such as television show, movies, news, sports, video, images, music, and other media. As an example, one or more filters can be presented with the content guide. As a further example, the content guide can comprise the filters. However, the filters can be presented adjacent the content guide or on a second screen device remote from the presentation of the content guide, for example.

In step 1104, first information can be received. In an aspect, the first information can comprise content commentary. As an example, the content commentary can be classified based upon a source of the commentary or a source identifier relating to the source of the commentary. In an aspect, the first information can relate to popularity of particular content. As an example, the first information can comprise current viewing statistics of particular content. As a further example, the first information can relate to a mood of a user. In an aspect, the first information can comprise supplemental content information relating to particular content. As an example, the supplemental content information can contextually relate to the particular content.

In step 1106, a first indicator can be presented. The first indicator can be an image, text, colorization, icon, video, audio, and the like. In an aspect, the first indicator can represent the first information received. As an example, the first indicator can be presented in response to a selection of a first one of the filters. As a further example, the first information relates to one or more entries presented in the content guide.

In step 1108, second information can be received. In an aspect, the second information can comprise content commentary. As an example, the content commentary can be classified based upon a source of the commentary or a source identifier relating to the source of the commentary. In an aspect, the second information can relate to popularity of particular content. As an example, the second information can comprise current viewing statistics of particular content. As a further example, the second information can relate to a mood of a user. In an aspect, the second information can comprise supplemental content information relating to particular content. As an example, the supplemental content information can contextually relate to the particular content.

In step 1110, a second indicator can be presented. The second indicator can be an image, text, colorization, icon, video, audio, and the like. In an aspect, the second indicator can represent the second information received. As an example, the second indicator can be presented in response to a selection of a second one of the filters. As a further example, the second information relates to one or more entries presented in the content guide.

In step 1112, a selection of one or more of the filters, or parameters represented by the filters, can be received. In an aspect, a user can select one or more of the filters. As an example, selection of one or more of the filters can be facilitated by a controller. As a further example, selection of one or more of the filters can be received by a computing device such as CT 120 and/or the user device 124.

In step 1114, one or more of the first information and the second information can be filtered. In an aspect, one or more of the first information and the second information can be filtered based upon the selected filter and/or filtering parameters associated with the selected filter.

In step 1116, one or more of the first indicator and the second indicator can be updated. In an aspect, one or more of the first indicator and the second indicator can be updated based on one or more of the filtered first information and the filtered second information.

Figure 12:
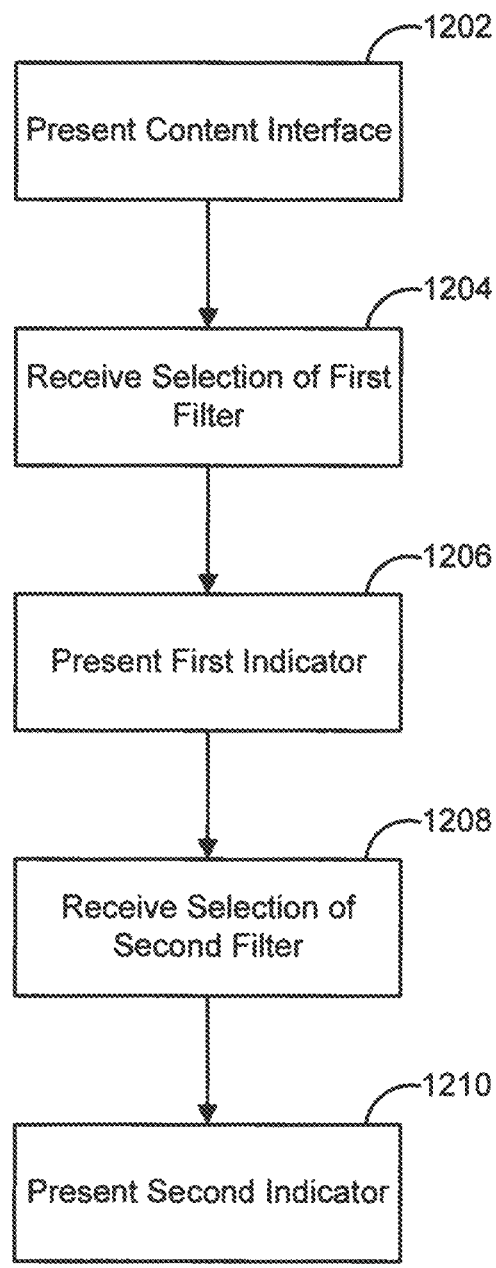
FIG. 12 is a flow chart of an exemplary method.

FIG. 12 illustrates an exemplary method for presenting content. In step 1202, an interface such as a content guide can be presented. In an aspect, the content guide can comprise one or more listings relating to content such as television show, movies, news, sports, video, images, music, and other media. As an example, one or more filters can be presented with the content guide. As a further example, the content guide can comprise the filters. However, the filters can be presented adjacent the content guide or on a second screen device remote from the presentation of the content guide, for example.

In step 1204, a selection of a first filter can be received. In an aspect, a user can select one or more of the filters. As an example, selection of one or more of the filters can be facilitated by a controller. As a further example, selection of one or more of the filters can be received by a computing device such as CT 120 and/or the user device 124. In another aspect, the first filter can relate content commentary. As an example, the content commentary can be classified based upon a source of the commentary or a source identifier relating to the source of the commentary. In an aspect, the first filter can relate to popularity of particular content. As an example, the first filter can relate to current viewing statistics of particular content. As a further example, the first filter can relate to a mood of a user.

In step 1206, a first indicator can be presented. The first indicator can be an image, text, colorization, icon, video, audio, and the like. As an example, the first indicator can be presented in response to a selection of the first filter. As a further example, the first indicator can relate to one or more entries presented in the content guide. The first indicator can be presented adjacent the field. The first indicator can be presented in any position.

In step 1208, a selection of a second filter can be received. In an aspect, a user can select one or more of the filters. As an example, selection of one or more of the filters can be facilitated by a controller. As a further example, selection of one or more of the filters can be received by a computing device such as CT 120 and/or the user device 124. In another aspect, the second filter can relate to content commentary. As an example, the content commentary can be classified based upon a source of the commentary or a source identifier relating to the source of the commentary. In an aspect, the second filter can relate to popularity of particular content. As an example, the second filter can relate to current viewing statistics of particular content. As a further example, the second filter can relate to a mood of a user.

In step 1210, a second indicator can be presented. The second indicator can be an image, text, colorization, icon, video, audio, and the like. As an example, the second indicator can be presented in response to the selection of the second filter. As a further example, the second indicator can relate to one or more entries presented in the content guide. The second indicator can be presented adjacent the field. The second indicator can be presented in any position.

Figure 13:
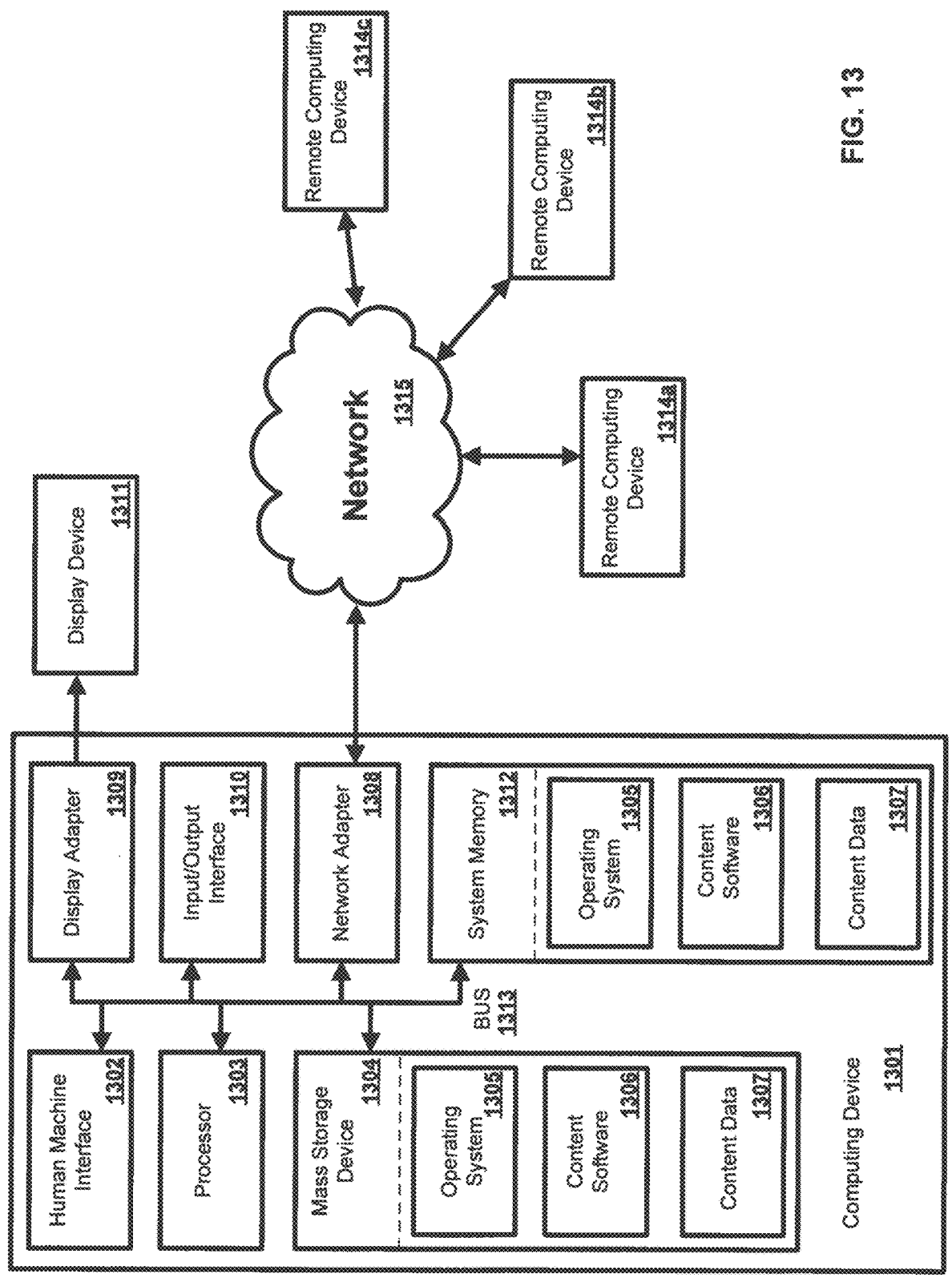
FIG. 13 is a block diagram of an exemplary computing device.

In an exemplary aspect, the methods and systems can be implemented on a computing system such as computing device 1301 as illustrated in FIG. 13 and described below. By way of example, one or more of the CT 120 and the user device 124 can comprise a computing device as illustrated in FIG. 13. Similarly, the methods and systems disclosed can utilize one or more computers to perform one or more functions in one or more locations. FIG. 13 is a block diagram illustrating an exemplary operating environment for performing the disclosed methods. One skilled in the art will appreciate that provided herein is a functional description and that the respective functions can be performed by software, hardware, or a combination of software and hardware. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 1301. The components of the computer 1301 can comprise, but are not limited to, one or more processors or processing units 1303, a system memory 1312, and a system bus 1313 that couples various system components including the processor 1303 to the system memory 1312. In the case of multiple processing units 1303, the system can utilize parallel computing.

The system bus 1313 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 1313, and all buses specified in this description can also be implemented over a wired or wireless network connection and each of the subsystems, including the processor 1303, a mass storage device 1304, an operating system 1305, content software 1306, content data 1307, a network adapter 1308, system memory 1312, an Input/Output Interface 1310, a display adapter 1309, a display device 1311, and a human machine interface 1302, can be contained within one or more remote computing devices 1314a,b,c at physically separate locations, connected through buses of this form, in effect implementing a fully distributed system.

The computing device 1301 typically comprises a variety of computer readable media. Exemplary readable media can be any available media that is accessible by the computing device 1301 and comprises, for example and not meant to be limiting, both volatile and non-volatile media, removable and non-removable media. The system memory 1312 comprises computer readable media in the form of volatile memory, such as random access memory (RAM), and/or non-volatile memory, such as read only memory (ROM). The system memory 1312 typically contains data such as content data 1307 and/or program modules such as operating system 1305 and content software 1306 that are immediately accessible to and/or are presently operated on by the processing unit 1303.

In another aspect, the computing device 1301 can also comprise other removable/non-removable, volatile/non-volatile computer storage media. By way of example, FIG. 13 illustrates a mass storage device 1304 which can provide non-volatile storage of computer code, computer readable instructions, data structures, program modules, and other data for the computing device 1301. For example and not meant to be limiting, a mass storage device 1304 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1304, including by way of example, an operating system 1305 and content software 1306. Each of the operating system 1305 and content software 1306 (or some combination thereof) can comprise elements of the programming and the content software 1306. Content data 1307 can also be stored on the mass storage device 1304. Content data 1307 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 1301 via an input device (not shown). Examples of such input devices comprise, but are not limited to, a keyboard, pointing device (e.g., a "mouse"), a microphone, a joystick, a scanner, visual systems such as Microsoft's Kinect, audio systems that process sound such as music or speech, a traditional silver remote control, tactile input devices such as gloves, touch-responsive screen, body coverings, and the like These and other input devices can be connected to the processing unit 1303 via a human machine interface 1302 that is coupled to the system bus 1313, but can be connected by other interface and bus structures, such as a parallel port, game port, an IEEE 1394 Port (also known as a Firewire port), a serial port, or a universal serial bus (USB).

In yet another aspect, a display device 1311 can also be connected to the system bus 1313 via an interface, such as a display adapter 1309. It is contemplated that the computer 1301 can have more than one display adapter 1309 and the computing device 1301 can have more than one display device 1311. For example, a display device can be a monitor, an LCD (Liquid Crystal Display), or a projector. In addition to the display device 1311, other output peripheral devices can comprise components such as speakers (not shown) and a printer (not shown) which can be connected to the computing device 1301 via Input/Output Interface 1310. Any step and/or result of the methods can be output in any form to an output device. Such output can be any form of visual representation, including, but not limited to, textual, graphical, animation, audio, tactile, and the like. The display 1311 and computing device 1301 can be part of one device, or separate devices.

The computing device 1301 can operate in a networked environment using logical connections to one or more remote computing devices 1314$a,b,c$. By way of example, a remote computing device can be a personal computer, portable computer, a smartphone, a server, a router, a network computer, a peer device or other common network node, and so on. Logical connections between the computing device 1301 and a remote computing device 1314$a,b,c$ can be made via a network 1315, such as a local area network (LAN) and a general wide area network (WAN). Such network connections can be through a network adapter 1308. A network adapter 1308 can be implemented in both wired and wireless environments. Such networking environments are conventional and commonplace in dwellings, offices, enterprise-wide computer networks, intranets, and the Internet. Furthermore, the computing device 1301 can communicate information to one or more of the remote computing devices 1314$a,b,c$ for data analysis, pattern recognition, and content navigation and/or control, for example.

For purposes of illustration, application programs and other executable program components such as the operating system 1305 are illustrated herein as discrete blocks, although it is recognized that such programs and components reside at various times in different storage components of the computing device 1301, and are executed by the data processor(s) of the computer. An implementation of content software 1306 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

In an aspect, the systems and methods of the present disclosure can minimize time to market for on screen applications and maximize the breadth of devices that can implement certain applications having navigation components.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
causing output of an interface comprising a plurality of fields, wherein each field of the plurality of fields relates to a content item of a plurality of content items;
determining, based on a selection of a first filter, current viewing statistics for the plurality of content items;
determining, based on a selection of a second filter, social media information for the plurality of content items; and
causing, based on the selection of the first filter and the selection of the second filter, output, via the interface, of both a first indicator and a second indicator in at least one field of the plurality of fields, wherein the first indicator is indicative of the current viewing statistics for the content item associated with the at least one field and the second indicator is indicative of the social media information for the content item associated with the at least one field.

2. The method of claim 1, wherein the plurality of fields are organized by channel in a first dimension and organized by time in a second dimension.

3. The method of claim 1, wherein the first indicator comprises an image, a colorization of a field, or an icon.

4. The method of claim 1, wherein the first indicator represents a trend, based on the current viewing statistics, associated with viewing the content item relating to the at least one field.

5. The method of claim 4, wherein the first indicator displays color information having an intensity indicative of the trend.

6. The method of claim 1, wherein the second indicator comprises an image, a colorization of a field, or an icon.

7. The method of claim 1, wherein the second indicator represents a popularity, based on the social media information, of the content item relating to the at least one field.

8. The method of claim 1, wherein at least one of the first indicator or the second indicator represents an ability to purchase access to the content item relating to the at least one field.

9. The method of claim 1, wherein at least one of the first indicator or the second indicator represents an ability to gift the content item relating to the at least one field as video on-demand content to another user.

10. The method of claim 1, further comprising, determining, based on a selection of a third filter, commentary associated with the plurality of content items.

11. The method of claim 10, further comprising presenting, via the interface, a third indicator in the at least one field of the plurality of fields, wherein the third indicator is indicative of the commentary for the content item associated with the at least one field.

12. The method of claim 1, wherein the current viewing statistics comprises one or more of: a total number of viewers at any given time, an average number of viewers over a period of time, a cumulative number of viewers over a period of time, a percentage of total television audience viewing at least one of the plurality of content items, a commercial viewership, or demographic data.

13. A method comprising:
presenting an electronic program guide (EPG), wherein the EPG indicates a title of a content item;
determining, based on a selection of a first filter, current viewing statistics for the content item;
determining, based on a selection of a second filter, social media information for the content item; and
presenting, via the EPG, both a first indicator and a second indicator proximate to the title of the content item, wherein the first indicator is indicative of the current viewing statistics for the content item and the second indicator is indicative of the social media information for the content item.

14. The method of claim 13, wherein the first indicator comprises an image, a colorization of a field, or an icon.

15. The method of claim 13, wherein the first indicator represents a trend, based on the current viewing statistics, associated with viewing the content item.

16. The method of claim 15, wherein the first indicator displays color information having an intensity indicative of the trend.

17. The method of claim 13, wherein the second indicator comprises an image, a colorization of a field, or an icon.

18. The method of claim 13, wherein the second indicator represents a popularity, based on the social media information, of the content item.

19. The method of claim 13, wherein at least one of the first indicator or the second indicator represents an ability to purchase access to the content item.

20. The method of claim 13, wherein at least one of the first indicator or the second indicator represents an ability to gift the content item as video on-demand content to another user.

21. The method of claim 13, wherein the current viewing statistics comprises one or more of: a total number of viewers at any given time, an average number of viewers over a time period, a cumulative number of viewers over a time period, a percentage of total television audience viewing the content item, a commercial viewership, or demographic data.

22. A method comprising:
presenting an interface comprising a plurality of fields, wherein each field of the plurality of fields relates to a content item of a plurality of content items;
presenting, via the interface, both a first indicator in at least one field of the plurality of fields, wherein the first indicator is indicative of current viewing statistics for the content item relating to the at least one field and a second indicator in the at least one field of the plurality of fields, wherein the second indicator is indicative of social media information associated with the content item relating to the at least one field; and updating, based on selection of a filter, at least one of the first indicator or the second indicator.

\* \* \* \* \*